US009627115B2

(12) United States Patent
Akselrod et al.

(10) Patent No.: US 9,627,115 B2
(45) Date of Patent: *Apr. 18, 2017

(54) MAGNETIC PLASMONIC NANOPARTICLE DIMER

(71) Applicant: Elwha LLC, Bellevue, WA (US)

(72) Inventors: Gleb M. Akselrod, Durham, NC (US); Roderick A. Hyde, Redmond, WA (US); Muriel Y. Ishikawa, Livermore, CA (US); Jordin T. Kare, San Jose, CA (US); Maiken H. Mikkelsen, Durham, NC (US); Tony S. Pan, Bellevue, WA (US); David R. Smith, Durham, NC (US); Clarence T. Tegreene, Mercer Island, WA (US); Yaroslav A. Urzhumov, Bellevue, WA (US); Charles Whitmer, North Bend, WA (US); Lowell L. Wood, Jr., Bellevue, WA (US); Victoria Y. H. Wood, Livermore, CA (US)

(73) Assignee: Elwha LLC

( * ) Notice: Subject to any disclaimer, the term of this patent is extended or adjusted under 35 U.S.C. 154(b) by 0 days.

This patent is subject to a terminal disclaimer.

(21) Appl. No.: 14/853,410

(22) Filed: Sep. 14, 2015

(65) Prior Publication Data
US 2017/0076844 A1    Mar. 16, 2017

(51) Int. Cl.
*H01F 1/06* (2006.01)
*H01F 1/20* (2006.01)
*H01F 1/00* (2006.01)

(52) U.S. Cl.
CPC ............. *H01F 1/06* (2013.01); *H01F 1/0018* (2013.01); *H01F 1/20* (2013.01)

(58) Field of Classification Search
None
See application file for complete search history.

(56) References Cited

U.S. PATENT DOCUMENTS

| 6,162,532 A * | 12/2000 | Black | B82Y 25/00 |
| | | | 427/128 |
| 7,135,055 B2 * | 11/2006 | Mirkin | A61K 47/48861 |
| | | | 75/343 |

(Continued)

OTHER PUBLICATIONS

Ahniyaz et al.; "Magnetic field-induced assembly of oriented superlattices from maghemite nanocubes"; PNAS; Nov. 6, 2007; pp. 17570-17574; vol. 104, No. 45.

Diaz Fernandez et al.; "Research Update: Progress in synthesis of nanoparticle dimers by self-assembly"; APL Materials; Jan. 7, 2014; pp. 010702-1 to 010702-12; vol. 2.

(Continued)

*Primary Examiner* — Kevin Bernatz

(57) ABSTRACT

Described embodiments include a system, method, and apparatus. The apparatus includes a plasmonic nanoparticle dimer. The dimer includes a first plasmonic nanoparticle having a first magnetic element covered by a first negative-permittivity layer comprising a first plasmonic outer surface. The dimer includes a second plasmonic nanoparticle having a second magnetic element covered by a second negative-permittivity layer comprising a second plasmonic outer surface. The dimer includes a separation control structure configured to establish a dielectric-filled gap between the first plasmonic outer surface and the second plasmonic outer surface. A magnetic attraction between the first magnetic element and the second magnetic element binds the first plasmonic nanoparticle and the second plasmonic nanoparticle together, separated by the dielectric-filled gap established by the separation control structure. The first plasmonic outer surface, the dielectric-filled gap, and the second plasmonic outer surface are configured to cooperatively support one or more mutually coupled plasmonic excitations.

31 Claims, 6 Drawing Sheets

(56) References Cited

U.S. PATENT DOCUMENTS

| | | | | |
|---|---|---|---|---|
| 7,829,140 | B1* | 11/2010 | Zhong | A61K 49/183 427/212 |
| 7,996,538 | B2 | 8/2011 | Kikkawa et al. | |
| 7,998,538 | B2* | 8/2011 | Greengard | C23C 8/00 118/724 |
| 8,247,025 | B2 | 8/2012 | Lee | |
| 8,343,627 | B2* | 1/2013 | Zhong | B01J 13/02 428/403 |
| 9,037,214 | B2* | 5/2015 | Chen | A61K 49/0002 600/420 |
| 2002/0160195 | A1* | 10/2002 | Halas | B22F 1/0018 428/403 |
| 2003/0158474 | A1* | 8/2003 | Scherer | B82Y 15/00 600/409 |
| 2004/0247924 | A1* | 12/2004 | Andres | B03C 1/00 428/546 |
| 2005/0202244 | A1* | 9/2005 | Papagianakis | B09C 1/002 428/403 |
| 2006/0057384 | A1* | 3/2006 | Simard | B22F 1/025 428/403 |
| 2006/0286379 | A1* | 12/2006 | Gao | G01N 33/54326 428/403 |
| 2007/0151631 | A1* | 7/2007 | Fernandez Camacho | A61K 41/0052 148/300 |
| 2008/0241262 | A1* | 10/2008 | Lee | A61K 9/0009 424/490 |
| 2009/0294692 | A1* | 12/2009 | Bourke, Jr. | A23L 3/26 250/459.1 |
| 2010/0164489 | A1* | 7/2010 | Lukaszew | G01N 33/54326 324/244.1 |
| 2010/0297009 | A1 | 11/2010 | Olson et al. | |
| 2010/0307705 | A1* | 12/2010 | Rahm | B42D 25/00 162/140 |
| 2011/0086195 | A1 | 4/2011 | Shukla et al. | |
| 2011/0311791 | A1 | 12/2011 | Chien et al. | |
| 2012/0219772 | A9 | 8/2012 | Chien et al. | |
| 2012/0224255 | A1* | 9/2012 | Bora | B82Y 20/00 359/346 |
| 2012/0258051 | A1* | 10/2012 | Bell | H01F 1/0054 424/9.42 |
| 2013/0040292 | A1* | 2/2013 | Fernandez Lopez | B82Y 15/00 435/6.11 |
| 2013/0327928 | A1* | 12/2013 | Leach | B82Y 20/00 250/216 |
| 2014/0209837 | A1* | 7/2014 | Barcelo | G01N 21/658 252/408.1 |
| 2014/0356411 | A1* | 12/2014 | Fan | G01N 21/658 424/443 |
| 2015/0037818 | A1* | 2/2015 | Huang | C23C 18/1635 435/7.23 |
| 2016/0168386 | A1* | 6/2016 | Aizenberg | C09D 17/006 514/770 |
| 2016/0266104 | A1* | 9/2016 | Suh | G01N 33/54346 |

OTHER PUBLICATIONS

Gschneidtner et al.; "A Versatile Self-Assembly Strategy for the Synthesis of Shape-Selected Colloidal Noble Metal Nanoparticle Heterodimers"; Langmuir; Mar. 3, 2014; pp. 3041-3050; vol. 30; American Chemical Society.

Lee et al.; "Preparation of plasmonic magnetic nanoparticles and their light scattering properties"; RSC Advances; Feb. 4, 2015; 2 Total Pages; Issue 27 (Abstract only).

Levin et al.; "Magnetic—Plasmonic Core—Shell Nanoparticles"; ACS Nano; May 14, 2009; pp. 1379-1388; vol. 3, No. 6; American Chemical Society.

"Magnetic Nanoparticles"; Wikipedia; Jul. 13, 2015; 6 Total Pages; located at: en.wikipedia.org/wiki/Magnetic_nanoparticles.

Marinica et al.; "Quantum Plasmonics: Nonlinear Effects in the Field Enhancement of a Plasmonic Nanoparticle Dimer"; Nano Letters; Feb. 9, 2012; pp. 1333-1339; vol. 12; American Chemical Society.

"Plasmonic Substrates"; Booksh Research Group; Created on Aug. 17, 2015; 3 Total Pages; located at: www.udel.edu/chem/booksh/substrates.html.

Punj et al.; "Self-Assembled Nanoparticle Dimer Antennas for Plasmonic-Enhanced Single-Molecule Fluorescence Detection at Micromolar Concentrations"; ACS Photonics; Jul. 21, 2015; pp. 1099-1107 (2 Total Pages); vol. 2, No. 8; American Chemical Society (Abstract Only).

Ringe et al.; "Correlated structure-optical properties studies of plasmonic nanoparticles"; Electron Microscopy and Analysis Group Conference; Journal of Physics: Conference Series; 2014; pp. 1-6; vol. 522; IOP Publishing.

Ringe et al.; "Plasmon Length: A Universal Parameter to Describe Size Effects in Gold Nanoparticles"; The Journal of Physical Chemistry Letters; May 4, 2012; pp. 1479-1483; vol. 3; American Chemical Society.

Romero et al.; "Plasmons in nearly touching metallic nanoparticles: singular response in the limit of touching dimers"; Optics Express; Created on Aug. 17, 2015, Bearing a date of 2006; 11 Total Pages; vol. 14, Issue 21; Optical Society of America.

"Self-assembly of nanoparticles"; Wikipedia; Jul. 8, 2015; 9 Total Pages; located at: en.wikipedia.org/wiki/Self-assembly_of_nanoparticles.

Thacker et al.; "DNA origami based assembly of gold nanoparticle dimers for surface-enhanced Raman scattering"; Nature Communications; Mar. 13, 2014; 10 Total Pages; vol. 5, Article No. 3448.

Wang et al.; "Core-Shell-Structured Magnetic Ternary Nanocubes"; Journal of the American Chemical Society; Dec. 1, 2010; pp. 17686-17689 (2 Total Pages); vol. 132, No. 50; American Chemical Society (Abstract Only).

Enoch et al., *Plasmonics: From Basics to Advanced Topics*, 2012, p. 165, ISBN-10: 3642441238, Springer.

Schnitzer et al., "Asymptotics of surface-plasmon redshift saturation at sub-nanometric separations" Phys. Rev. B 93, 041409(R), Nov. 16, 2015, physics.optics.

* cited by examiner

FIG. 4
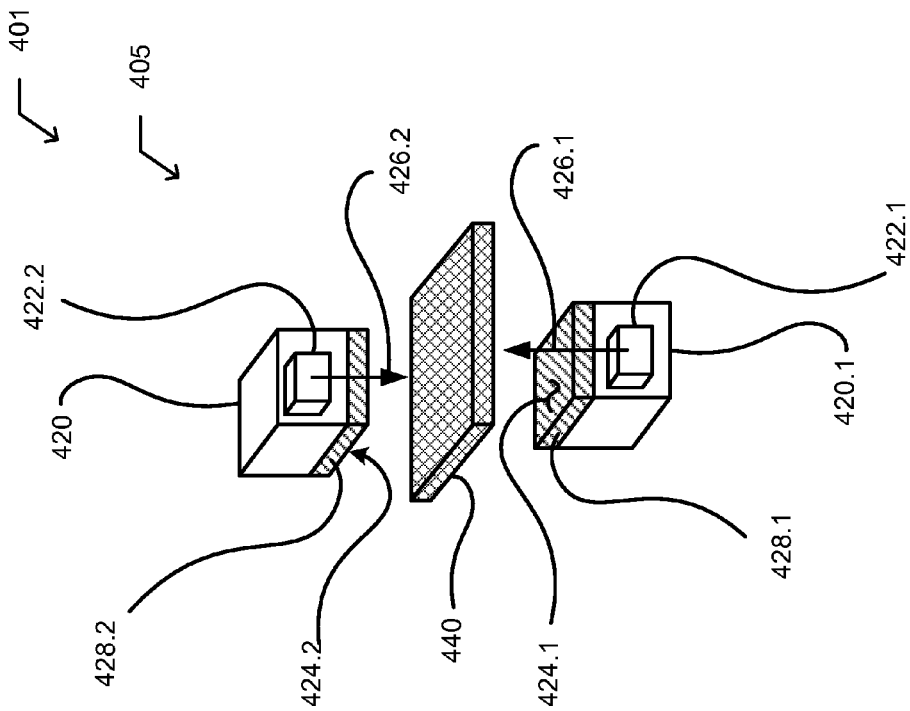
FIG. 4A
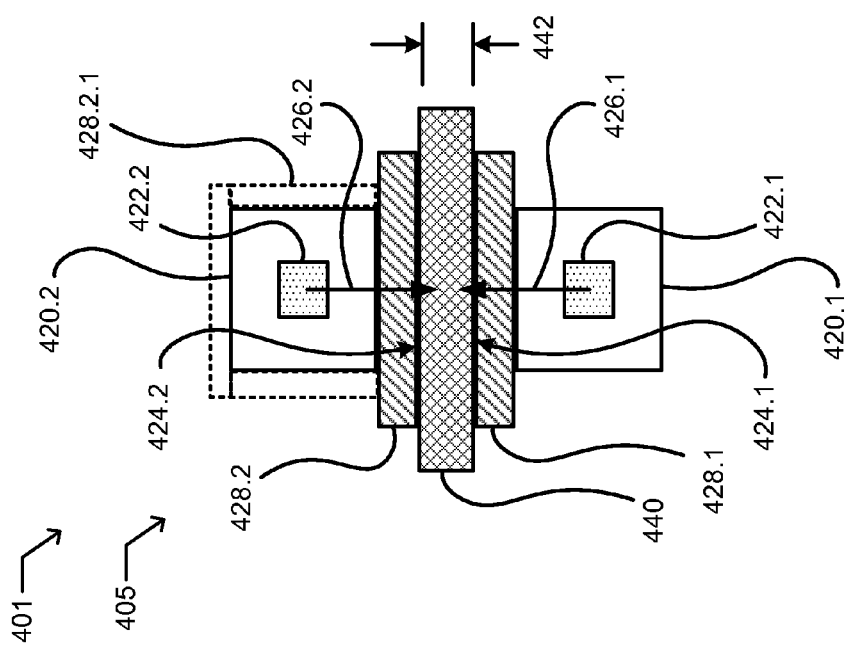
FIG. 4B

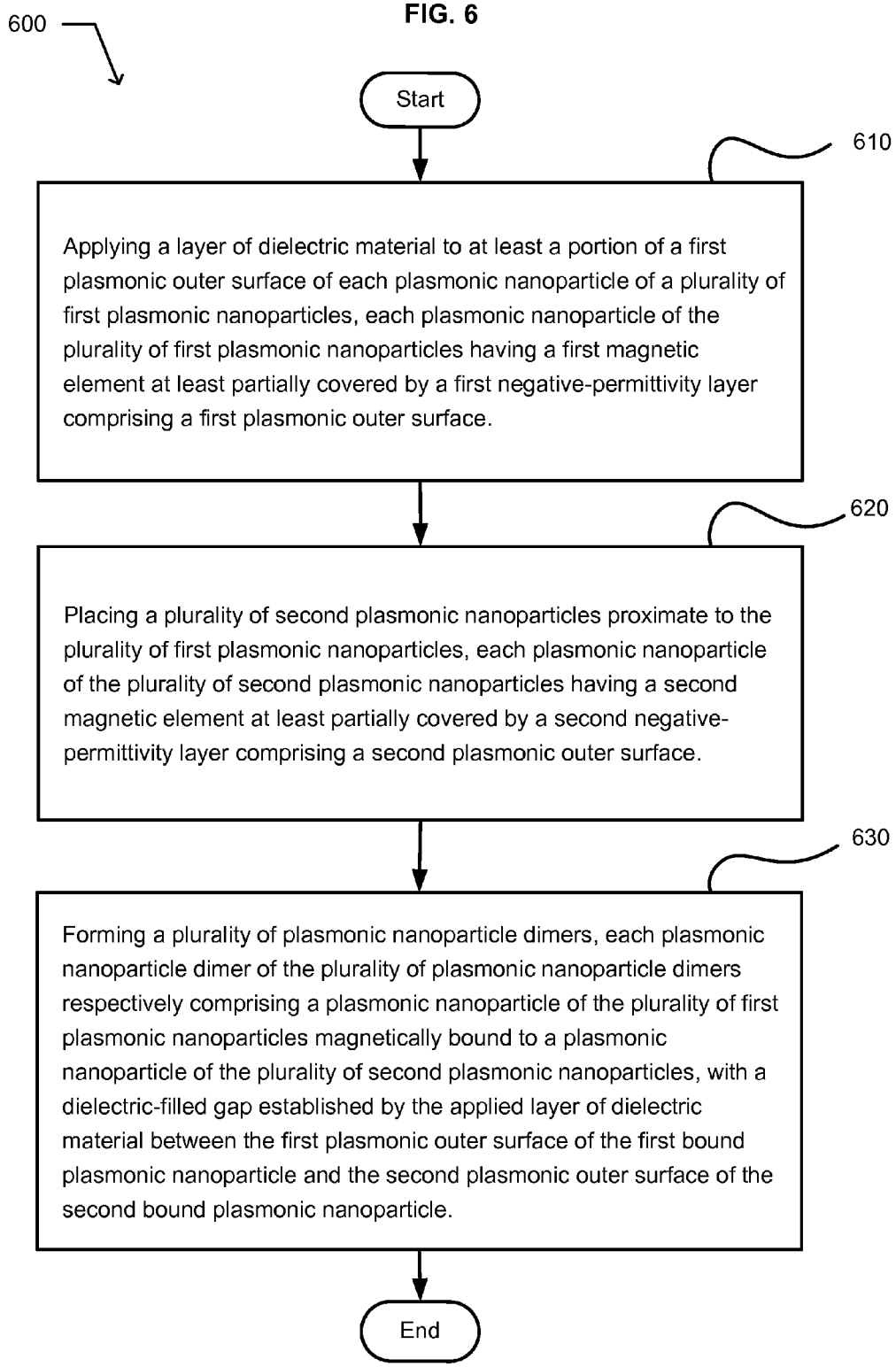

MAGNETIC PLASMONIC NANOPARTICLE DIMER

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

For example, and without limitation, an embodiment of the subject matter described herein includes an apparatus. The apparatus includes a plasmonic nanoparticle dimer. The plasmonic nanoparticle dimer includes a first plasmonic nanoparticle having a first magnetic element at least partially covered by a first negative-permittivity layer comprising a first plasmonic outer surface. The plasmonic nanoparticle dimer includes a second plasmonic nanoparticle having a second magnetic element at least partially covered by a second negative-permittivity layer comprising a second plasmonic outer surface. The plasmonic nanoparticle dimer includes a separation control structure configured to establish a dielectric-filled gap between the first plasmonic outer surface and the second plasmonic outer surface. A magnetic attraction between the first magnetic element and the second magnetic element binds the first plasmonic nanoparticle and the second plasmonic nanoparticle together, separated by the dielectric-filled gap established by the separation control structure. The first plasmonic outer surface, the dielectric-filled gap, and the second plasmonic outer surface are configured to cooperatively support one or more mutually coupled plasmonic excitations.

In an embodiment, the apparatus includes the plasmonic nanoparticle dimer in a gas, fluid, or solid colloid. In an embodiment, the apparatus includes the plasmonic nanoparticle dimer in a gas, fluid, or solid colloidal. In an embodiment, the apparatus includes the plasmonic nanoparticle dimer in a colloidal suspension. In an embodiment, the apparatus includes the plasmonic nanoparticle dimer in a colloidal solution. In an embodiment, the plasmonic nanoparticle dimer includes a plasmonic nanoparticle trimer. The trimer includes a third plasmonic nanoparticle having a third magnetic element at least partially covered by a third negative-permittivity layer comprising a third plasmonic outer surface.

For example, and without limitation, an embodiment of the subject matter described herein includes a system. The system includes a mixture of a plurality of plasmonic nanoparticle dimers in a dispersion medium. Each plasmonic nanoparticle dimer of the plurality of plasmonic nanoparticle dimers includes a first plasmonic nanoparticle having a first magnetic element at least partially covered by a first negative-permittivity layer comprising a first plasmonic outer surface. Each plasmonic nanoparticle dimer of the plurality of plasmonic nanoparticle dimers includes a second plasmonic nanoparticle having a second magnetic element at least partially covered by a second negative-permittivity layer comprising a second plasmonic outer surface. The system includes the dispersion medium. Each plasmonic nanoparticle dimer of the plurality of plasmonic nanoparticle dimers includes a separation control structure configured to establish a dielectric-filled gap between the first plasmonic outer surface and the second plasmonic outer surface. A magnetic attraction between the first magnetic element and the second magnetic element binds the first plasmonic nanoparticle and the second plasmonic nanoparticle together, separated by the dielectric-filled gap established by the separation control structure. The first plasmonic outer surface, the dielectric-filled gap, and the second plasmonic outer surface are configured to cooperatively support one or more mutually coupled plasmonic excitations. In an embodiment, the system includes a capsule configured to hold the mixture.

For example, and without limitation, an embodiment of the subject matter described herein includes a method. The method includes applying a layer of dielectric material to at least a portion of a first plasmonic outer surface of each plasmonic nanoparticle of a plurality of first plasmonic nanoparticles. Each plasmonic nanoparticle of the plurality of first plasmonic nanoparticles having a first magnetic element at least partially covered by a first negative-permittivity layer comprising a first plasmonic outer surface. The method includes placing a plurality of second plasmonic nanoparticles proximate to the plurality of first plasmonic nanoparticles. Each plasmonic nanoparticle of the plurality of second plasmonic nanoparticles having a second magnetic element at least partially covered by a second negative-permittivity layer comprising a second plasmonic outer surface. The method includes forming a plurality of plasmonic nanoparticle dimers. Each plasmonic nanoparticle dimer of the plurality of plasmonic nanoparticle dimers respectively comprising a plasmonic nanoparticle of the plurality of first plasmonic nanoparticles magnetically bound to a plasmonic nanoparticle of the plurality of second plasmonic nanoparticles. A dielectric-filled gap is established by the applied layer of dielectric material between the first plasmonic outer surface of the first bound plasmonic nanoparticle and the second plasmonic outer surface of the second bound plasmonic nanoparticle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4A is a schematic side view of an example apparatus 401;

FIG. 4B is an exploded view of the example apparatus 401;

FIG. 6 illustrates an example operational flow 600.

DETAILED DESCRIPTION

Figure 1:
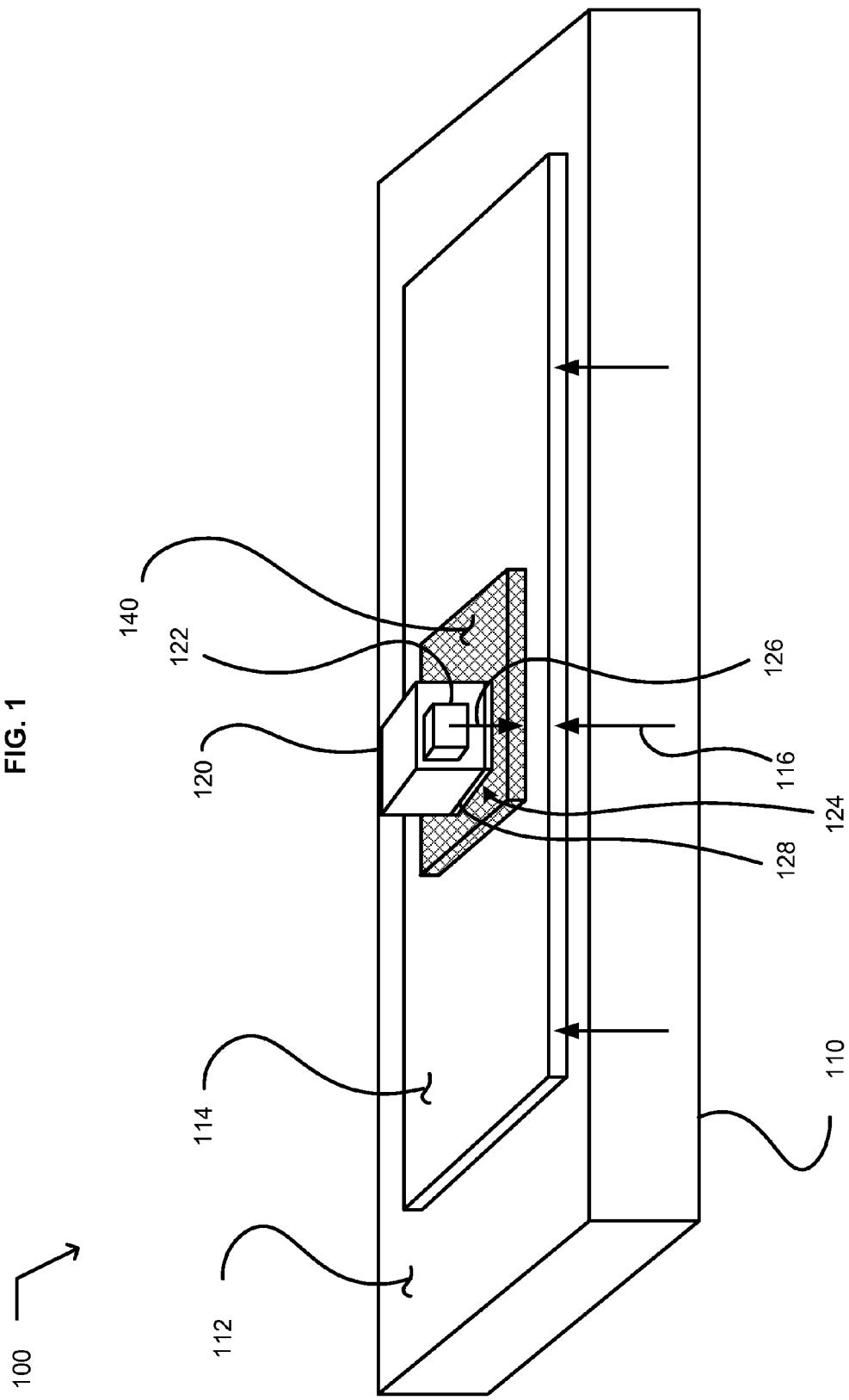
FIG. 1 illustrates an example embodiment of an apparatus 100.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example embodiment of an apparatus 100. The apparatus includes a magnetic substrate 110 at least partially covered by a first negative-permittivity layer 114 comprising a first plasmonic outer surface 112. The magnetic field of the magnetic substrate is illustrated by a magnetic field 116. The apparatus includes a plasmonic nanoparticle 120 having a magnetic element 122 at least partially covered by second negative-permittivity layer 128 comprising a second plasmonic outer surface 124. The magnetic field of the magnetic element is illustrated by a magnetic field 126. An example magnetic plasmonic nanoparticle with continuous Au shell layers is described by C. S. Levin et al., *Magnetic—Plasmonic Core—Shell Nanoparticles*, ACS Nano, 2009, 3 (6), pp 1379-1388, 2009) (accessed Aug. 3, 2015, at http://pubs.acs.org/doi/abs/10.1021/nn900118a). An example process of fabricating magnetic nanoparticles is described in K. Lee, *Magnetic Nanoparticle Formation*, U.S. Pat. No. 8,247,025.

The apparatus 100 includes a dielectric-filled gap 140 between the first plasmonic outer surface 112 and the second plasmonic outer surface 124. The first plasmonic outer surface, the dielectric-filled gap, and the second plasmonic outer surface are configured to support one or more mutually coupled plasmonic excitations. In an embodiment, use of the word "plasmonic" such as in "plasmonic outer surface" or "plasmonic nanoparticle" includes a structure or configuration supporting a plasmonic excitation either alone or in combination with at least one other element.

In an embodiment, the magnetic substrate 100 includes magnetisable substrate. In an embodiment, the magnetic substrate includes a magnetic substrate configured to temporarily magnetically attract the plasmonic nanoparticle 120. In an embodiment, the magnetisable substrate, the first plasmonic nanoparticle outer surface 124 or the dielectric of the dielectric-filled gap 140 include an adhesive configured to bond the plasmonic nanoparticle and the magnetic substrate after the temporary magnetization is turned off. In an embodiment, the magnetic substrate includes a magnetic substrate configured to permanently magnetically attract the plasmonic nanoparticle. In an embodiment, the magnetic substrate 110, the second plasmonic outer surface 124, or the dielectric of the dielectric-filled gap 140 include an adhesive configured to bond the plasmonic nanoparticle and the magnetic substrate.

In an embodiment, the magnetic substrate 110 includes a plurality of magnetized landing or retention areas each configured to magnetically attract a respective plasmonic nanoparticle of a plurality of plasmonic nanoparticles. In an embodiment, the plurality magnetized landing or retention areas are each configured to retain one plasmonic nanoparticle. In an embodiment, the plurality magnetized landing or retention areas are each configured to retain one plasmonic nanorod. In an embodiment, the magnetic substrate includes a plurality of magnetized pixelated landing or retention areas. In an embodiment, the plurality of magnetized landing or retention areas are spatial separated from each other. In an embodiment, the magnetic substrate includes a magnetic substrate having a switchable magnetic state. For example, a switchable magnetic state may include a magnetic state switchable on and off. For example, a switchable magnetic state may include a magnetic state switchable between a first magnetic field strength and a second magnetic strength. In an embodiment, the first plasmonic outer surface or the second plasmonic outer surface includes an adhesive configured to bond the plasmonic nanoparticle 120 and the magnetic substrate 110. In an embodiment, the adhesive is a dielectric adhesive that at least partially forms the dielectric-filled gap 140. In an embodiment, the first negative-permittivity layer has negative permittivity within a defined frequency range. In an embodiment, the second negative-permittivity layer has negative permittivity within a defined frequency range.

In an embodiment, the first negative-permittivity layer 114 includes a metallic layer. In an embodiment, the first negative-permittivity layer includes a semi-metallic layer. In an embodiment, the first negative-permittivity layer includes a semiconductor layer. In an embodiment, the first negative-permittivity layer includes a polaritonic dielectric layer. In an embodiment, the plasmonic outer surface 124 is covered with the second negative-permittivity layer.

In an embodiment, the plasmonic nanoparticle 120 includes a plasmonic nanocube particle. In an embodiment, the plasmonic nanocube particle has a side length between about 50 nm and about 350 nm. In an embodiment, the plasmonic nanoparticle includes a plasmonic nanorod. In an embodiment, the plasmonic nanoparticle includes a decahedra, cage, spheroid, or triangular nanoprism shaped plasmonic nanoparticle. In an embodiment, the plasmonic nanoparticle has a size ranging between 1-100 nm. In an embodiment, the plasmonic nanoparticle has a size ranging between 20 and 400 nm. In an embodiment, the plasmonic nanoparticle includes a plasmonic nanoparticle having an arbitrary shape. For example, an arbitrary shape may include a sphere, bow tie, or some other arbitrary shape functioning as a magnetic plasmonic nanoparticle. In an embodiment, the plasmonic nanoparticle includes a first plasmonic nanoparticle and a second plasmonic nanoparticle. The first plasmonic nanoparticle comprising a first magnetic element having a first magnetic strength. The second plasmonic nanoparticle comprising a second magnetic element having a second magnetic strength different from the first magnetic strength. For example, nanocubes with different strengths or layouts of their magnetic elements are expected to allow a sequence-based self-assembly on the magnetic substrate. In an embodiment, the plasmonic nanoparticle includes a first plasmonic nanoparticle and a second plasmonic nanoparticle. The first plasmonic nanoparticle comprising a first side characteristic or shape dimensions. The second plasmonic nanoparticle comprising a second side characteristic or shape dimensions that are different from the first side characteristic or shape dimensions.

In an embodiment, the magnetic element 122 includes a magnetic core. In an embodiment, the magnetic element includes a ferromagnetic or paramagnetic element. In an embodiment, the magnetic element includes a permanent magnetic element. In an embodiment, the permanent magnetic element includes a dipole, quadrapole, or more general field geometry. In an embodiment, the magnetic element includes a magnetisable element. In an embodiment, the magnetic element includes a magnetic element configured to temporarily magnetically attract the magnetic substrate. In an embodiment, the magnetic element includes a magnetic element configured to permanently magnetically attract the magnetic substrate.

In an embodiment, the second negative-permittivity layer 128 includes a noble metal. In an embodiment, the second negative-permittivity layer at least partially encloses the magnetic element. In an embodiment, the second negative-permittivity layer is formed over at least a side of the magnetic element. In an embodiment, the second negative-permittivity layer is covered by a dielectric coating or film configured to at least partially form the dielectric-filled gap. In an embodiment, the first plasmonic outer surface 124 is at least partially cladded with the second negative-permittivity layer. In an embodiment, the second negative-permittivity layer includes a metallic layer. In an embodiment, the second negative-permittivity layer includes a semi-metallic layer. In an embodiment, the second negative-permittivity layer includes a semiconductor layer or a polaritonic dielectric layer. In an embodiment, the first plasmonic outer surface 124 or the second plasmonic outer surface includes an adhesive configured to bond the plasmonic nanoparticle and the magnetic substrate. In an embodiment, the adhesive is a dielectric adhesive that at least partially forms the dielectric-filled gap 140.

In an embodiment, the at least a portion of the dielectric-filled gap 140 comprises a dielectric coating or layer applied to the first plasmonic outer surface 112 of the magnetic substrate 110. In an embodiment, the at least a portion of the dielectric-filled gap comprises a dielectric coating or layer applied to the second plasmonic outer surface 124 of the plasmonic nanoparticle 120. In an embodiment, the dielectric-filled gap has a gap spacing of less than 200 nm. In an embodiment, the dielectric-filled gap has a gap spacing of less than 100 nm. In an embodiment, the dielectric-filled gap has a gap spacing of less than 50 nm. In an embodiment, the dielectric-filled gap has a gap spacing of less than 25 nm. In an embodiment, the dielectric-filled gap has a gap spacing greater than 0 nm and less than 50 nm. In an embodiment, the dielectric-filled gap has a gap spacing of greater than 5 nm. In an embodiment, the dielectric-filled gap has a gap spacing of greater than 2 nm. In an embodiment, the dielectric includes a hard or soft dielectric material.

In an embodiment, the magnetic field 116 of the magnetic substrate 110 and the magnetic field 126 of the magnetic element 122 of the plasmonic nanoparticle 120 are configured to magnetically interact. In an embodiment, the magnetic interaction includes a magnetic attraction of the plasmonic nanoparticle toward a preselected location on the first plasmonic outer surface. In an embodiment, the magnetic interaction includes a magnetic repulsion of the plasmonic nanoparticle away from a preselected location on the first plasmonic outer surface. In an embodiment, the magnetic interaction between the magnetic substrate and the magnetic element of the plasmonic nanoparticle controls the gap dimension of the dielectric-filled gap. In an embodiment, a compliant dielectric material forms at least a portion of the dielectric-filled gap and controls the gap dimension between the magnetic substrate and the magnetic element. In an embodiment, the magnetic interaction includes an attraction or a repulsion.

In an embodiment of the apparatus 100, the plasmonic nanoparticle 120 includes a two plasmonic nanoparticles deposited of the magnetic substrate 110 in a dimer configuration. In an embodiment, the two plasmonic nanoparticles are separated by a dielectric coating carried by one or both nanoparticles.

Figure 2:
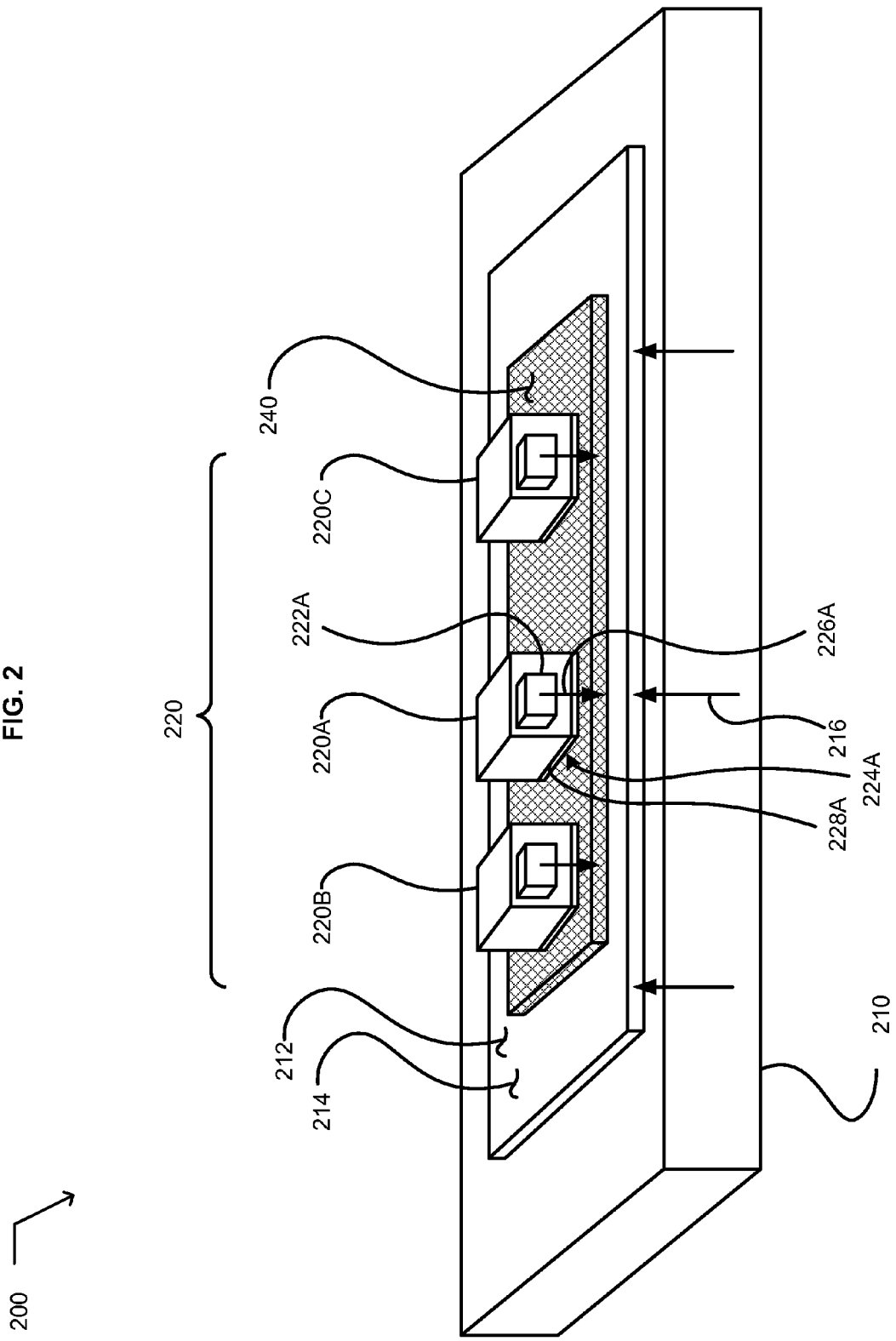
FIG. 2 illustrates an example embodiment of an apparatus 200.

FIG. 2 illustrates an example embodiment of an apparatus 200. The apparatus includes a magnetic substrate 210 at least partially covered by a first negative-permittivity layer 214 comprising a first plasmonic outer surface 212. The magnetic field of the magnetic substrate is illustrated by a magnetic field 216. The apparatus includes a plurality of plasmonic nanoparticles 220, illustrated by plasmonic nanoparticles 220A, 220B, and 220C. Plasmonic nanoparticle 220A is illustrative of each plasmonic nanoparticle of the plurality of plasmonic nanoparticles. Plasmonic nanoparticle 220A comprises a magnetic element 222A at least partially covered by a second negative-permittivity layer 228A comprising a second plasmonic outer surface 224A. The magnetic field of the magnetic core is illustrated by a magnetic field 226A. The apparatus includes a respective dielectric-filled gap 240 between the first plasmonic outer surface 212 and the second plasmonic outer surface 224A of each plasmonic nanoparticle of the plurality of plasmonic nanoparticles, illustrated by the second negative-permittivity layer 228A of plasmonic nanoparticle 220A. The first plasmonic outer surface 212, the dielectric-filled gap 240, and the second plasmonic outer surface (illustrated by the second plasmonic outer surface 224A of plasmonic nanoparticle 220A) are configured to support one or more mutually coupled plasmonic excitations.

In an embodiment, the plurality of plasmonic nanoparticles 220 are individually deposited in a controlled manner on the first plasmonic outer surface 212 of the magnetic substrate 210. In an embodiment, individually deposited plasmonic nanoparticles include plasmonic nanotubes individually positioned or individually placed on the first plasmonic outer surface of the magnetic substrate. In an embodiment, individually deposited plasmonic nanoparticles include plasmonic nanoparticles individually positioned or placed on the first plasmonic outer surface of the magnetic substrate. For example, in an embodiment, the plurality of plasmonic nanoparticles are individually deposited in a controlled manner on the first plasmonic outer surface of the magnetic substrate using a two-dimensional printer or a three-dimensional printer. In an embodiment, the plurality of plasmonic nanoparticles are individually deposited in a controlled manner on the first plasmonic outer surface of the magnetic substrate using a magnetic interaction between the magnetic field 216 of the magnetic substrate and the respective magnetic elements 222A of the plurality of plasmonic nanoparticles 220. In an embodiment, each plasmonic nanoparticle of the plurality of plasmonic nanoparticles is individually deposited in a controlled manner on the first plasmonic outer surface of the magnetic substrate in a pattern storing data. This may be a magnetic memory (i.e., individual pixels may be magnetized/demagnetized) with random access, or serial access, or just a magnetic layer that may be written on, for example like a disk-type magnetic head. In an embodiment, small scale magnetic fields are used to maneuver an individual nanoparticle to a preselected position functioning as a memory bit. In an embodiment, the plurality of individually deposited magnetic plasmonic nanoparticles are respectively individually deposited with respect to each other on the first plasmonic outer surface of the magnetic substrate. In an embodiment, the plurality of individually deposited magnetic plasmonic nanoparticles are respectively individually positioned on the first plasmonic outer surface of the magnetic substrate. In an embodiment, the plurality of individually deposited magnetic plasmonic nanoparticles are respectively individually deposited with respect to a magnetized landing or retention area on the first plasmonic outer surface. For example, the magnetized landing or retention area may be configured to place nanocubes. In an embodiment, the magnetized landing or retention area includes a magnetized landing pixel or a retention pixel. The magnetic pixels may be static or dynamically changeable so as to automatically reposition nanocubes. In an embodiment, the plurality of individually deposited magnetic plasmonic nanoparticles are respectively retained in their respective positions on the first plasmonic outer surface by a magnetic attraction between the magnetic substrate and the respective magnetic element of each individually deposited plasmonic nanoparticle. For example, the positioning may be relative to other nanocubes. For example, the plurality of plasmonic magnetic nanocubes may constitute a self-assembling array on the first plasmonic outer surface.

In an embodiment, the plurality of individually deposited plasmonic nanoparticles 220 are temporarily retained in their respective positions on the first plasmonic outer surface 212 of the magnetic substrate 210 by a magnetic attraction between the magnetic substrate and the respective magnetic element of each individually deposited plasmonic nanoparticle. For example, the temporary retention may be implemented by magnetizing the magnetic substrate or magnetizing the magnetic element of a plasmonic nanoparticle of the plurality of plasmonic nanoparticles. The magnetizing may be implemented by passing an electric current through a coil. In an embodiment, the magnetisable substrate 210, the first plasmonic outer surface, the second plasmonic outer surface 224A, or the dielectric of the dielectric-filled gap 240 include an adhesive configured to bond the plasmonic nanoparticle and the magnetic substrate after the magnetization is turned off In an embodiment, the plurality of individually deposited plasmonic nanoparticles 220 are temporarily retained in their respective positions on the magnetic substrate 210 by a magnetization of the magnetic substrate. In an embodiment, the magnetization is induced by an electric current. In an embodiment, the plurality of individually deposited plasmonic nanoparticles are respectively permanently retained in their respective positions on the magnetic substrate by a magnetic attraction between the magnetic substrate and the respective magnetic element of each individually deposited plasmonic nanoparticle. In an embodiment, the plurality of plasmonic nanoparticles are each respectively deposited in a preselected location on the substrate in a configuration implementing a photonic circuit. In an embodiment, the plurality of plasmonic nanoparticles are each respectively deposited in a preselected location on the substrate in a configuration implementing a visual display.

In an embodiment, the first negative-permittivity layer 214A includes a metallic layer. In an embodiment, the second negative-permittivity layer 228A includes a metallic layer. In an embodiment, the magnetic substrate 210 and the magnetic element 222A of each nanoparticle of the plurality of nanoparticles 220 are configured to magnetically interact. In an embodiment, the first plasmonic outer surface 212 of the magnetic substrate is covered with the first negative-permittivity layer. In an embodiment, the second plasmonic outer surface 224A is covered with the second negative-permittivity layer. In an embodiment, the first negative-permittivity layer 214 has negative permittivity within a defined frequency range. In an embodiment, the second negative-permittivity layer has negative permittivity within a defined frequency range.

In an embodiment of the apparatus 200, the plurality of plasmonic nanoparticles 220 were collectively delivered to the first plasmonic outer surface 212 of the magnetic substrate 210, and individually positioned or placed by a magnetic field on the first plasmonic outer surface of the magnetic substrate in a selected arrangement. In an embodiment, the plurality of plasmonic nanoparticles are each deposited in a respective preselected location on the first plasmonic outer surface of the substrate in a configuration storing selected data. In an embodiment, the plurality of plasmonic nanoparticles are each respectively deposited in a preselected location on the first plasmonic outer surface in a configuration implementing a photonic circuit. In an embodiment, the plurality of plasmonic nanoparticles are each respectively deposited in a preselected location on the first plasmonic outer surface in a configuration implementing a visual display.

In an embodiment of the apparatus 200, the first negative-permittivity layer 214 includes a metallic layer. In an embodiment the second negative-permittivity layer 228A includes a metallic layer.

Figure 3:
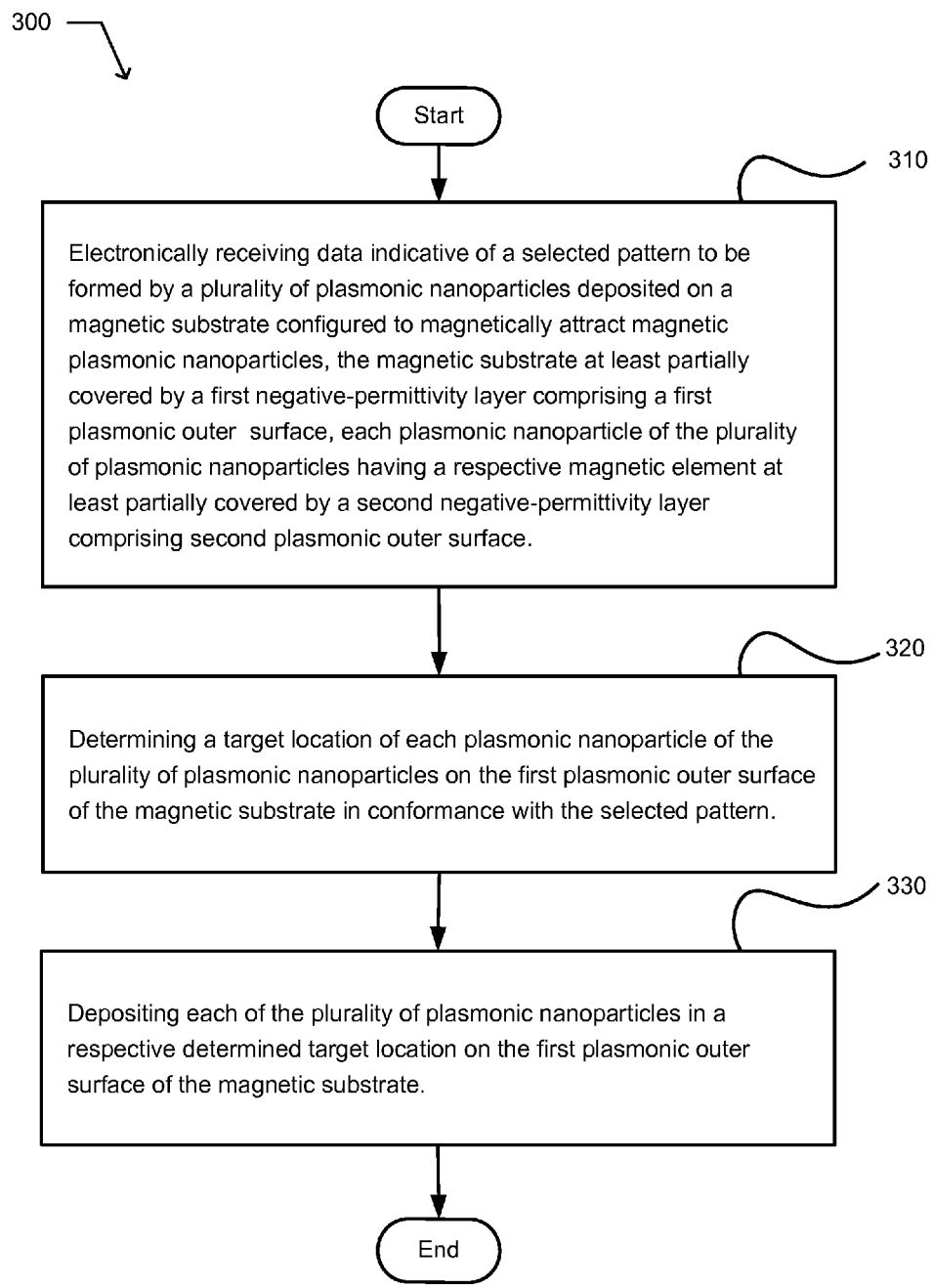
FIG. 3 illustrates an example operational flow 300.

FIG. 3 illustrates an example operational flow 300. After a start operation, the operational flow includes a reception operation 310. The reception operation includes electronically receiving data indicative of a selected pattern to be formed by a plurality of plasmonic nanoparticles deposited on a magnetic substrate configured to magnetically attract magnetic plasmonic nanoparticles. The magnetic substrate at least partially covered by a first negative-permittivity layer comprising a first plasmonic outer surface. Each plasmonic nanoparticle of the plurality of plasmonic nanoparticles having a respective magnetic element at least partially covered by a second negative-permittivity layer comprising a second plasmonic outer surface. In an embodiment, the magnetic substrate is configured to retain and bond to the magnetic plasmonic nanoparticles. A layout operation 320 includes determining a target location of each plasmonic nanoparticle of the plurality of plasmonic nanoparticles on the first plasmonic outer surface of the magnetic substrate in conformance with the selected pattern. An encoding operation 330 includes depositing each of the plurality of plasmonic nanoparticles in a respective determined target location on the first plasmonic outer surface of the magnetic substrate. The operational flow includes an end operation.

In an embodiment, the encoding operation 330 includes individually depositing each of the plurality of plasmonic nanoparticles in a respective determined target location on the first plasmonic outer surface of the magnetic substrate. In an embodiment, the encoding operation includes collectively delivering the plurality of plasmonic nanoparticles proximate to the magnetic substrate and then individually positioning each respective plasmonic nanoparticle in a respective determined target location on the first plasmonic outer surface of the magnetic substrate. For example, the plurality of plasmonic nanoparticles may be delivered proximate to the magnetic substrate suspended in a fluid.

FIGS. 4A and 4B illustrate an example apparatus 401. FIG. 4A is a schematic side view of the apparatus and FIG. 4B is an exploded schematic view of the apparatus. The apparatus includes a plasmonic nanoparticle dimer 405. In an embodiment, the nanoparticle dimer includes intercoupled nanoparticles. The nanoparticle dimer includes a first plasmonic nanoparticle 420.1 having a first magnetic element 422.1 at least partially covered by a first negative-permittivity layer 428.1 compromising a first plasmonic outer surface 424.1. The first magnetic element generates a first magnetic field 426.1. The nanoparticle dimer includes a second plasmonic nanoparticle 420.2 having a second magnetic element 422.2 at least partially covered by a second negative-permittivity layer 428.2 comprising a second plasmonic outer surface 424.2. The second magnetic element generates a second magnetic field 426.2. The nanoparticle dimer includes a separation control structure 440 configured to establish a dielectric-filled gap 442 between the first plasmonic outer surface and the second plasmonic outer surface. In an embodiment, the dielectric-filled gap includes an inter-particle dielectric-filled gap. The magnetic attraction between the first magnetic field of the first magnetic element and the second magnetic field of the second magnetic element binds the first plasmonic nanoparticle and the second plasmonic nanoparticle together, separated by the dielectric-filled gap established by the separation control structure. The first plasmonic outer surface, the dielectric-filled gap, and the second plasmonic outer surface are configured to cooperatively support one or more mutually coupled plasmonic excitations. A mutually coupled plasmonic excitation includes a bonding dimer plasmon mode. A mutually coupled plasmonic excitation includes a bonding surface plasmon.

FIG. 4A illustrates an embodiment of the second plasmonic outer surface 424.2 completely covered by a second negative-permittivity layer, illustrated by the portion at least partially covered by the second negative-permittivity layer 428.2 and remaining portion covered by the second negative-permittivity layer 428.2.1.

In an embodiment, the first negative-permittivity layer 428.1 includes a metallic layer. In an embodiment, the second negative-permittivity layer 428.2 includes a metallic layer. In an embodiment, the first magnetic element 422.1 includes a ferromagnetic or paramagnetic element. In an embodiment, the first magnetic element 422.1 includes a permanent magnetic element. In an embodiment, the permanent magnet may include a dipole, a quadrapole, or a more general field geometry. In an embodiment, the first magnetic element includes a magnetisable element.

In an embodiment, the separation control structure 440 includes a non-electrically conductive separation control structure. In an embodiment, the separation control structure includes a dielectric film or dielectric coating applied to the first plasmonic nanoparticle 420.1. In an embodiment, the separation control structure includes at least two dielectric elements projecting outward from the first plasmonic outer surface 424.1. In an embodiment, the separation control structure includes a dielectric spacer element coupled with the first plasmonic outer surface. In an embodiment, the separation control structure includes a dielectric-filled gap 442 between the first plasmonic outer surface 424.1 and the second plasmonic outer surface 424.2. In an embodiment, the separation control structure is configured to establish or maintain a selected dielectric-filled gap between the first plasmonic outer surface 424.1 and the second plasmonic outer surface 424.2. In an embodiment, the separation control structure is configured to define a dielectric-filled gap between the first plasmonic outer surface and the second plasmonic outer surface. In an embodiment, the separation control structure is configured to establish a minimum separation dielectric-filled gap between the first plasmonic nanoparticle and the second plasmonic nanoparticle. In an embodiment, the dielectric-filled gap is less than a maximum chord length of the first nanoparticle. In an embodiment, the dielectric-filled gap is less than a maximum axis length of the first nanoparticle. In an embodiment, the dielectric-filled gap is less than a maximum characteristic length of the first nanoparticle. In an embodiment, the dielectric-filled gap is less than about 10 percent of the maximum chord length of the first nanoparticle. In an embodiment, the dielectric-filled gap is greater than about 0.05 percent of the maximum chord length of the first nanoparticle. In an embodiment, the dielectric-filled gap is less than about 50 nm. In an embodiment, the dielectric-filled gap is less than about 20 nm. In an embodiment, the dielectric-filled gap is less than about 10 nm. In an embodiment, the dielectric-filled gap is less than about 5 nm.

In an embodiment, the apparatus 401 includes the nanoparticle dimer 405 carried a gas, fluid, or solid colloid. In an embodiment, the apparatus includes the nanoparticle dimer in a gas, fluid, or solid colloidal. In an embodiment, the apparatus includes the nanoparticle dimer in a colloidal suspension. In an embodiment, the apparatus includes the nanoparticle dimer in a colloidal solution.

In an embodiment, the plasmonic nanoparticle dimer 405 is configured to have a selected resonant band frequency signature or profile. For example, the selected resonant band frequency signature or profile includes a resonance frequency shift(s). In an embodiment, the plasmonic nanoparticle dimer is configured to have a selected optical absorption spectrum. In an embodiment, the plasmonic nanoparticle dimer is configured to have a selected Raman scattering signature or profile. In an embodiment, the plasmonic nanoparticle dimer includes a plasmonic nanoparticle trimer. The trimer includes a third plasmonic nanoparticle comprising a third magnetic element at least partially covered by a third negative-permittivity layer comprising a third plasmonic outer surface.

Figure 5:
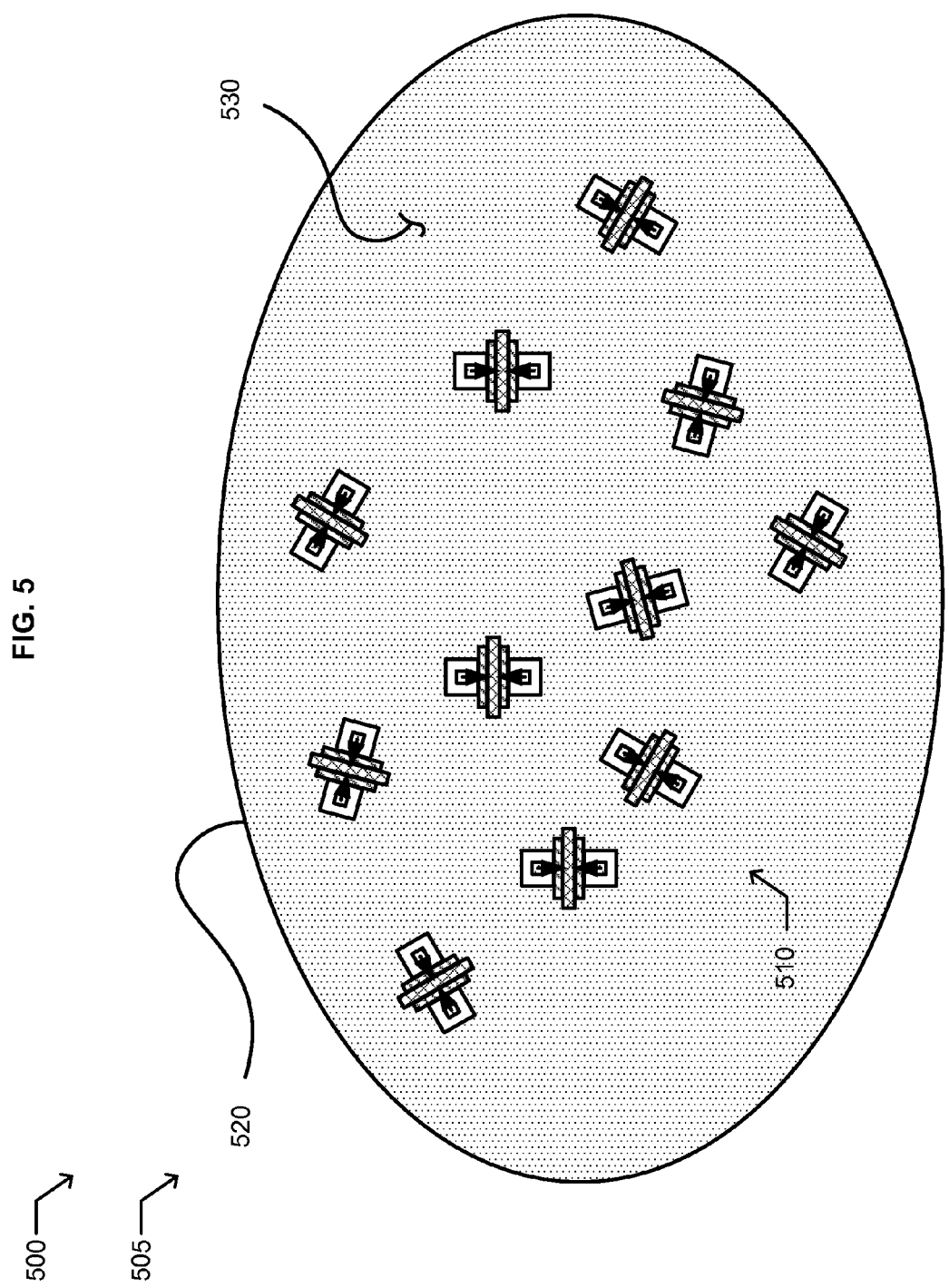
FIG. 5 illustrates an example system 500.

FIG. 5 illustrates an example system 500. The system includes a mixture 505 of a plurality of plasmonic nanoparticle dimers 510 in a dispersion medium 530. Each plasmonic nanoparticle dimer of the plurality of plasmonic nanoparticle dimers includes a first plasmonic nanoparticle comprising a first magnetic element at least partially covered by a first negative-permittivity layer comprising a first plasmonic outer surface. The first magnetic element generates a first magnetic field. Each nanoparticle dimer of the plurality of nanoparticle dimers also includes a second plasmonic nanoparticle comprising a second magnetic element at least partially covered by a second negative-permittivity layer comprising a second plasmonic outer surface. The second magnetic element generates a second magnetic field. Each plasmonic nanoparticle dimer of the plurality of plasmonic nanoparticle dimers also includes a separation control structure configured to establish a dielectric-filled gap between the first plasmonic outer surface and the second plasmonic outer surface. In an embodiment, the dielectric-filled gap includes an inter-particle dielectric-filled gap between the first plasmonic nanoparticle and the second plasmonic nanoparticle. A magnetic attraction between the first magnetic element and the second magnetic element binds the first plasmonic nanoparticle and the second plasmonic nanoparticle together, separated by the dielectric-filled gap established by the separation control structure. The first plasmonic outer surface, the dielectric-filled gap, and the second plasmonic outer surface are configured to cooperatively support one or more mutually coupled plasmonic excitations. The system includes the dispersion medium 530. In an embodiment, a plasmonic nanoparticle dimer of the plurality of plasmonic nanoparticle dimers 510 may be implemented using the plasmonic nanoparticle dimer 405 described in conjunction with FIGS. 4A and 4B.

In an embodiment, the mixture includes a colloid mixture. For example, a colloid is one of the three primary types of mixtures, with the other two being a solution and suspension. For example, a colloid is a solution with particles ranging between 1 and 1000 nanometers in diameter. These particles remain evenly distributed throughout the solution. These are also known as colloidal dispersions because the substances remain dispersed and do not settle to the bottom of a container. In colloids, one substance is evenly dispersed in another. The substance being dispersed is referred to as being in the dispersed phase, while the substance in which it is dispersed is in the continuous phase.

In an embodiment, the first negative-permittivity layer of the first plasmonic nanoparticle includes a metallic layer. In an embodiment, the second negative-permittivity layer of the second plasmonic nanoparticle includes a metallic layer. In an embodiment, the first plasmonic outer surface of the first plasmonic nanoparticle is covered with the first negative-permittivity layer. In an embodiment, the second plasmonic outer surface of the second plasmonic nanoparticle is covered with the second negative-permittivity layer.

In an embodiment, the dispersion medium 530 includes a fluid. In an embodiment, the dispersion medium includes a solid. In an embodiment, the dispersion medium includes a gas.

In an embodiment, the system 500 includes a capsule 520 configured to hold the mixture 505. In an embodiment, the capsule is configured to hold the mixture during injection, transport, or storage. In an embodiment, the capsule includes a biocompatible capsule. For example, a biocompatible capsule is compatible with living cells, tissues, organs, or systems. For example, a biocompatible capsule poses minimal or no risk of injury, toxicity, or rejection by an immune system of an animal. In an embodiment, the capsule is configured to bind with a biocompatible ligand. In an embodiment, the biocompatible ligand is also configured to bind with a human receptor.

FIG. 6 illustrates an example operational flow 600. After a start operation, the operational flow includes a coating operation 610. The coating operation includes applying a layer of dielectric material to at least a portion of a first plasmonic outer surface of each plasmonic nanoparticle of a plurality of first plasmonic nanoparticles. Each plasmonic nanoparticle of the plurality of first plasmonic nanoparticles having a first magnetic element at least partially covered by a first negative-permittivity layer comprising a first plasmonic outer surface. For example, the coating operation may be implemented by applying dielectric material to the first plasmonic outer surface 424.1 of the first plasmonic nanoparticle 420.1 as described in conjunction with FIGS. 4A and 4B. A positioning operation 620 includes placing a plurality of second plasmonic nanoparticles proximate to the plurality of first plasmonic nanoparticles. Each plasmonic nanoparticle of the plurality of second plasmonic nanoparticles having a second magnetic element at least partially covered by a second negative-permittivity layer comprising a second plasmonic outer surface. For example, the positioning operation may be implemented by placing the second plasmonic nanoparticle 420.2 proximate to the first plasmonic nanoparticle 420.1 coated with the dielectric material 440 as described in conjunction with FIGS. 4A and 4B. An assembly operation 630 includes forming a plurality of plasmonic nanoparticle dimers. Each plasmonic nanoparticle dimer of the plurality of plasmonic nanoparticle dimers respectively comprising a plasmonic nanoparticle of the plurality of first plasmonic nanoparticles magnetically bound to a plasmonic nanoparticle of the plurality of second plasmonic nanoparticles, with a dielectric-filled gap established by the applied layer of dielectric material between the first plasmonic outer surface of the first bound plasmonic nanoparticle and the second plasmonic outer surface of the second bound plasmonic nanoparticle. For example, the assembly operation may be implemented by a magnetic attraction between the first magnetic field 426.1 of the first magnetic element 422.1 of the first plasmonic nanoparticle 420.1 and the second magnetic field 426.2 of the second magnetic element 422.2 of the second plasmonic nanoparticle 420.2 as described in conjunction with FIGS. 4A and 4B. The operational flow includes an end operation.

In an embodiment, the dielectric material includes a dielectric material that is deformed less than five percent in the presence of the magnetic binding of a plasmonic nanoparticle of the first plurality of plasmonic nanoparticles to a plasmonic nanoparticle of the plurality of second nanoparticles. In an embodiment, the applying a dielectric material includes applying a layer of dielectric material having a controlled or specified thickness.

In an embodiment, the dielectric-filled gap is less than 100 nm. In an embodiment, the dielectric-filled gap is less than 10 nm. In an embodiment, the dielectric-filled gap is less than 5 nm. In an embodiment, the dielectric-filled gap is greater than 2 nm and less than 50 nm.

In an embodiment of the coating operation 610, the applying a layer of dielectric material includes adhering a layer of dielectric material to the plasmonic outer surface of each plasmonic nanoparticle of a plurality of first plasmonic nanoparticles. In an embodiment, the applying further includes applying a layer of adhesive to the applied dielectric material.

In an embodiment of the positioning operation 620, the placing includes placing a plurality of second plasmonic nanoparticles proximate to the dielectric layer applied to the plasmonic outer surface of each plasmonic nanoparticle of the plurality of first plasmonic nanoparticles.

In an embodiment of the assembly operation 630, the forming includes actively facilitating forming a plurality of plasmonic nanoparticle dimers. For example, actively facilitating may include a shaking, heating, or cooling of the plurality of first plasmonic nanoparticles or the plurality of second plasmonic nanoparticles. For example, actively facilitating may include adding a catalyst to the plurality of first plasmonic nanoparticles and the plurality of second plasmonic nanoparticles. For example, actively facilitating may include adding an agent promoting the forming the plurality of plasmonic nanoparticle dimers. For example, actively facilitating may include placing the plurality of first plasmonic nanoparticles and the plurality of second plasmonic nanoparticles in a medium, such as a dispersion medium, allowing or facilitating a mobility of these nanoparticles toward each other in response to a magnetic attraction between the first magnetic element of the plasmonic nanoparticles of the first plurality of plasmonic nanoparticles and the second magnetic element of the plasmonic nanoparticles of the second plurality of plasmonic nanoparticles. In an embodiment, the forming includes passively facilitating forming the plurality of plasmonic nanoparticle dimers. For example, passively facilitating may include waiting a length of time for the formation of the plurality of plasmonic nanoparticle dimers. In an embodiment, the forming includes forming a plurality of self-assembled plasmonic nanoparticle dimers. In an embodiment, each plasmonic nanoparticle dimer of the plurality of plasmonic nanoparticle dimers respectively comprising a plasmonic nanoparticle of the first plurality of plasmonic nanoparticles magnetically bound to a plasmonic nanoparticle of the plurality of second nanoparticles by a magnetic attraction between the first magnetic element of the plasmonic nanoparticle of the first plurality of plasmonic nanoparticles and the second magnetic element of the plasmonic nanoparticle of the second plurality of plasmonic nanoparticles.

In an embodiment, the operational flow 600 further includes applying a layer of dielectric material to at least a portion of the second plasmonic outer surface of each plasmonic nanoparticle of the plurality of second plasmonic nanoparticles. In an embodiment, the dielectric-filled gap includes a dielectric-filled gap established by the layer of dielectric material applied to the first plasmonic outer surface of a plasmonic nanoparticle of the plurality of first plasmonic nanoparticles and by the second layer of dielectric material applied to the second plasmonic outer surface of a plasmonic nanoparticle of the plurality of second plasmonic nanoparticles.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:
1. An apparatus comprising:
a plasmonic nanoparticle dimer including;
a first plasmonic nanoparticle having a first magnetic element at least partially covered by a first negative-permittivity layer comprising a first plasmonic outer surface; and
a second plasmonic nanoparticle having a second magnetic element at least partially covered by a second negative-permittivity layer comprising a second plasmonic outer surface;
a separation control structure disposed between the first plasmonic outer surface and the second plasmonic outer surface and configured to maintain a dielectric-filled gap between the first plasmonic outer surface and the second plasmonic outer surface; and
the dielectric-filled gap comprising a distinct physical layer and extending beyond the first plasmonic outer surface or the second plasmonic surface in at least one direction,
wherein a magnetic attraction between the first magnetic element and the second magnetic element binds the first plasmonic nanoparticle and the second plasmonic nanoparticle together, separated by the dielectric-filled gap maintained by the separation control structure, and
wherein the first plasmonic outer surface, the dielectric-filled gap, and the second plasmonic outer surface are configured to cooperatively support bonding surface plasmons.

2. The apparatus of claim 1, wherein the first negative-permittivity layer includes a metallic layer.

3. The apparatus of claim 1, wherein the second negative-permittivity layer includes a metallic layer.

4. The apparatus of claim 1, wherein the first magnetic element includes a ferromagnetic or paramagnetic element.

5. The apparatus of claim 1, wherein the first magnetic element includes a permanent magnetic element.

6. The apparatus of claim 1, wherein the first magnetic element includes a magnetisable element.

7. The apparatus of claim 1, wherein the separation control structure includes a non-electrically conductive separation control structure.

8. The apparatus of claim 1, wherein the separation control structure includes a dielectric film or dielectric coating applied to the first plasmonic nanoparticle.

9. The apparatus of claim 1, wherein the separation control structure includes at least one dielectric element projecting outward from the first plasmonic outer surface.

10. The apparatus of claim 1, wherein the separation control structure includes a dielectric spacer element coupled with the first plasmonic outer surface.

11. The apparatus of claim 1, wherein the separation control structure includes a dielectric-filled gap separating the first plasmonic outer surface from the second plasmonic outer surface.

12. The apparatus of claim 1, wherein the separation control structure is configured to establish or maintain a selected dielectric-filled gap between the first plasmonic outer surface and the second plasmonic outer surface.

13. The apparatus of claim 1, wherein the separation control structure is configured to establish or maintain a dielectric-filled gap between the first plasmonic outer surface and the second plasmonic outer surface.

14. The apparatus of claim 1, wherein the dielectric-filled gap is less than a maximum chord length of the first plasmonic nanoparticle.

15. The apparatus of claim 1, wherein the dielectric-filled gap is less than about 50 nm.

16. The apparatus of claim 1, wherein the dielectric-filled gap is less than about 20 nm.

17. The apparatus of claim 1, wherein the dielectric-filled gap is less than about 10 nm.

18. The apparatus of claim 1, further comprising:
the plasmonic nanoparticle dimer in a gas, fluid, or solid colloidal.

19. The apparatus of claim 1, further comprising:
the plasmonic nanoparticle dimer in a colloidal suspension.

20. The apparatus of claim 1, further comprising:
the plasmonic nanoparticle dimer in a colloidal solution.

21. The apparatus of claim 1, wherein the plasmonic nanoparticle dimer is configured to have a selected resonant band frequency signature or profile.

22. The apparatus of claim 1, wherein the plasmonic nanoparticle dimer is configured to have a selected optical absorption spectrum.

23. The apparatus of claim 1, wherein the plasmonic nanoparticle dimer is configured to have a selected Raman scattering signature or profile.

24. The apparatus of claim 1, wherein the plasmonic nanoparticle dimer includes a plasmonic nanoparticle trimer, and the trimer includes a third plasmonic nanoparticle having a third magnetic element at least partially covered by a third negative-permittivity layer comprising a third plasmonic outer surface.

25. A system comprising:
a mixture of a plurality of plasmonic nanoparticle dimers in a dispersion medium;
each plasmonic nanoparticle dimer of the plurality of plasmonic nanoparticle dimers including;
a first plasmonic nanoparticle having a first magnetic element at least partially covered by a first negative-permittivity layer comprising a first plasmonic outer surface;
a second plasmonic nanoparticle having a second magnetic element at least partially covered by a second negative-permittivity layer comprising a second plasmonic outer surface;
a separation control structure configured to maintain a dielectric-filled gap between the first plasmonic outer surface and the second plasmonic outer surface;
the dielectric-filled gap comprising a distinct physical layer and extending in at least one direction beyond the first plasmonic outer surface or the second plasmonic surface; and
the dispersion medium,
wherein a magnetic attraction between the first magnetic element and the second magnetic element binds the first plasmonic nanoparticle and the second plasmonic nanoparticle together, separated by the dielectric-filled gap maintained by the separation control structure,
wherein the first plasmonic outer surface, the dielectric-filled gap, and the second plasmonic outer surface are configured to cooperatively support bonding surface plasmons.

26. The system of claim 25, wherein the mixture includes a colloidal.

27. The system of claim 25, wherein the dispersion medium includes a fluid.

28. The system of claim 25, wherein the dispersion medium includes a solid.

29. The system of claim 25, further comprising:
a capsule configured to hold the mixture.

30. An apparatus comprising:
a plasmonic nanoparticle dimer including;
- a first plasmonic nanoparticle having a first magnetic element at least partially covered by a first negative-permittivity layer comprising a first plasmonic outer surface; and
- a second plasmonic nanoparticle having a second magnetic element at least partially covered by a second negative-permittivity layer comprising a second plasmonic outer surface;
- a separation control structure configured to maintain a dielectric-filled gap between the first plasmonic outer surface and the second plasmonic outer surface; and
- the dielectric-filled gap comprising a distinct physical layer and extending beyond the first plasmonic outer surface or the second plasmonic surface in at least one direction, wherein the first magnetic element and the second magnetic element magnetically attract each other, and bind the first plasmonic nanoparticle and the second plasmonic nanoparticle together separated by the dielectric-filled gap, the binding configured to resist a separation of the first plasmonic nanoparticle from the second plasmonic nanoparticle during movement in a dispersion medium, and wherein the first plasmonic outer surface, the dielectric-filled gap, and the second plasmonic outer surface are configured to cooperatively support bonding surface plasmons.

31. A system comprising:
a mixture of a plurality of plasmonic nanoparticle dimers in a dispersion medium;
each plasmonic nanoparticle dimer of the plurality of plasmonic nanoparticle dimers including;
- a first plasmonic nanoparticle having a first magnetic element at least partially covered by a first negative-permittivity layer comprising a first plasmonic outer surface; and
- a second plasmonic nanoparticle having a second magnetic element at least partially covered by a second negative-permittivity layer comprising a second plasmonic outer surface;
- a separation control structure configured to maintain a dielectric-filled gap between the first plasmonic outer surface and the second plasmonic outer surface;
- the dielectric-filled gap comprising a distinct physical layer and extending in at least one direction beyond the first plasmonic outer surface or the second plasmonic surface; and the dispersion medium, wherein the first magnetic element and the second magnetic element magnetically attract each other, and bind the first plasmonic nanoparticle and the second plasmonic nanoparticle together separated by the dielectric-filled gap, the binding configured to resist a separation of the first plasmonic nanoparticle from the second plasmonic nanoparticle during movement in the dispersion medium, and wherein the first plasmonic outer surface, the dielectric-filled gap, and the second plasmonic outer surface are configured to cooperatively support bonding surface plasmons.

* * * * *